US011493335B2

(12) United States Patent
Usui

(10) Patent No.: US 11,493,335 B2
(45) Date of Patent: Nov. 8, 2022

(54) MEASUREMENT DEVICE AND MEASUREMENT METHOD

(71) Applicant: KABUSHIKI KAISHA TOSHIBA, Tokyo (JP)

(72) Inventor: Takashi Usui, Saitama Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/183,275

(22) Filed: Feb. 23, 2021

(65) Prior Publication Data
US 2022/0082377 A1 Mar. 17, 2022

(30) Foreign Application Priority Data
Sep. 16, 2020 (JP) .............................. JP2020-155241

(51) Int. Cl.
*G01B 17/00* (2006.01)
(52) U.S. Cl.
CPC .................................... *G01B 17/00* (2013.01)
(58) Field of Classification Search
CPC .......... G01B 17/00; G01N 2291/0232; G01N 2291/0423; G01N 29/069; G01N 29/14; G01M 5/0008; G01M 5/0066
See application file for complete search history.

(56) References Cited

U.S. PATENT DOCUMENTS

| 2002/0108445 A1* | 8/2002 | Wooh | G01N 29/2418 |
| | | | 73/643 |
| 2003/0142210 A1* | 7/2003 | Carlbom | G01S 11/12 |
| | | | 348/157 |
| 2009/0199642 A1* | 8/2009 | Fukutomi | G01N 29/07 |
| | | | 73/598 |

(Continued)

FOREIGN PATENT DOCUMENTS

| JP | 3450063 B2 | 9/2003 |
| JP | 2019-194541 | 11/2019 |

(Continued)

OTHER PUBLICATIONS

Zhu et al., "Non-contact imaging for surface-opening cracks in concrete with air-coupled sensors," Materials and Structures 38 (Nov. 2005), pp. 801-806 (Year: 2005).*

(Continued)

*Primary Examiner* — Mohammad K Islam
(74) *Attorney, Agent, or Firm* — Finnegan, Henderson, Farabow, Garrett & Dunner, LLP

(57) ABSTRACT

A measurement device and a measurement method capable of measuring a depth of a damage source in a structure having a thickness of a predetermined value or more. According to an embodiment, a measurement device includes a first detector and a signal processing device. The first detector selectively detects surface waves that are excited when first elastic waves generated inside a structure formed of a solid material have reached a surface of the structure. The information processing device obtains information about a depth of a source of the first elastic waves within the structure on the basis of information of at least one of an amplitude and a time of arrival of the surface waves detected by the first detector.

8 Claims, 10 Drawing Sheets

(56) References Cited

U.S. PATENT DOCUMENTS

| | | | | |
|---|---|---|---|---|
| 2010/0018313 | A1* | 1/2010 | Suetoshi | A61B 5/4509 |
| | | | | 73/597 |
| 2013/0289896 | A1* | 10/2013 | Cao | E01C 23/01 |
| | | | | 702/39 |
| 2014/0070935 | A1* | 3/2014 | Wang | B60C 23/0494 |
| | | | | 340/443 |
| 2017/0219471 | A1* | 8/2017 | Fisk | G01N 29/045 |
| 2019/0204182 | A1* | 7/2019 | Yamashita | G01M 13/04 |
| 2019/0331642 | A1* | 10/2019 | Fuchs | G01N 29/024 |
| 2021/0025854 | A1* | 1/2021 | Salamone | G01N 29/34 |

FOREIGN PATENT DOCUMENTS

| | | | |
|---|---|---|---|
| WO | WO 2015/119498 A1 | 8/2015 | |
| WO | WO 2021/240817 A1 | 12/2021 | |

OTHER PUBLICATIONS

Song et al., "Measurement of surface wave transmission coefficient across surface-breaking cracks and notches in concrete," J. Acoust. Soc. Am. 113 (2), Feb. 2003, pp. 717-725 (Year: 2003).*

Zhang et al. "Measurement of Rayleigh Wave Beams Using Angle Beam Wedge Transducers as the Transmitter and Receiver with Consideration of Beam Spreading," Sensors (Basel). Jun. 2017; 17(6): 1449. (Year: 2017).*

Kee et al., "Using air-coupled sensors to determine the depth of a surface-breaking crack in concrete," J. Acoust. Soc. Am., vol. 127, No. 3, Mar. 2010, pp. 1279-1287. (Year: 2010).*

M. Yamaguchi et al., "Elastic Waves on the Surface of Materials," Journal of the Metal Finishing Society of Japan, vol. 30, No. 12, pp. 626-632 (1979).

R.L. Sengbush, "Analysis and Suppression of Seismic Noise," in Seismic Exploration Methods, pp. 43-88 (1983).

* cited by examiner

MEASUREMENT DEVICE AND MEASUREMENT METHOD

CROSS-REFERENCE TO RELATED APPLICATION

This application is based upon and claims the benefit of Japanese Patent Application No. 2020-155241, filed Sep. 16, 2020; the entire contents of which are incorporated herein by reference.

FIELD

Embodiments described herein relate generally to a measurement device and a measurement method.

BACKGROUND

For example, fatigue cracks may occur in the structure due to the long-term use of a structure such as a bridge. The fatigue cracks develop with the passage of time and hence the structure deteriorates. As a method of detecting the deterioration of a structure, position evaluation analysis regarding a position where a fatigue crack has occurred in an acoustic emission (AE) scheme has been proposed.

DETAILED DESCRIPTION

According to some embodiments, a measurement device includes a first detector and a signal processing device. The first detector selectively detects surface waves that are excited when first elastic waves generated inside a structure formed of a solid material have reached a surface of the structure. The information processing device obtains information about the depth of a source of the first elastic waves within the structure on the basis of information of at least one of an amplitude and a time of arrival of the surface waves detected by the first detector.

Hereinafter, a measurement device and a measurement method of embodiments will be described with reference to the drawings. In the following description, configurations having the same or similar functions are denoted by the same reference signs. Also, redundant description of components having the same or similar functions may be omitted.

First Embodiment

Figure 1:
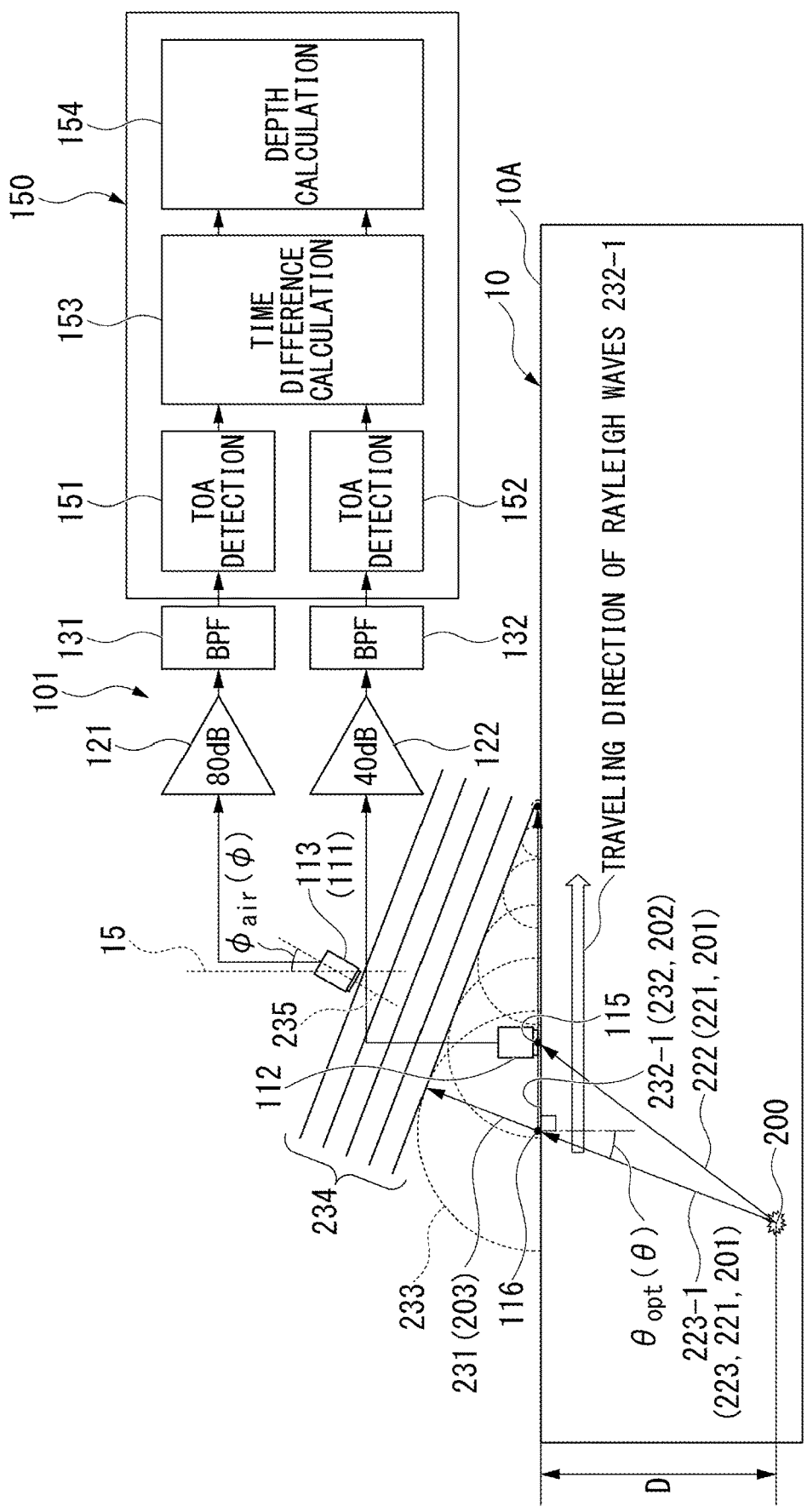
FIG. 1 is a side view showing an example of a configuration of a measurement device of a first embodiment.

FIG. 1 is a side view of a measurement device 101 of the first embodiment. The measurement device 101 and the measurement method of the first embodiment are a device and a method for acquiring information about a depth D of a source 200 of elastic waves (first elastic waves) inside a structure 10 as shown in FIG. 1. The "information about the depth of the source 200" described in the present specification is not limited to the value of a depth 10T from a surface 10A of the structure 10 to the source 200 and includes a relative evaluation result or the like of whether or not the depth 10T is deeper than a predetermined depth and indicates absolute and relative information about the depth 10T.

The structure 10 is formed of a solid material. The solid material is not particularly limited and may be, for example, concrete, iron, aluminum, ceramics, or a composite material such as carbon fiber reinforced plastic. The structure 10 has a predetermined thickness. The predetermined thickness is a thickness larger than a wavelength (i.e., a propagation velocity/frequency) determined by a frequency of a target to be detected by a sensor and an elastic wave propagation velocity which is a physical property specific to the solid material. The structure 10 is, for example, a road slab or a bridge. The term "bridge" used in the present specification is not limited to structures built over a river, a valley, and the like and broadly includes various structures provided above the ground such as viaducts of expressways.

As shown in FIG. 1, the measurement device 101 of the first embodiment includes an ultrasonic sensor (a first detector) 111, an AE sensor (a second detector) 112, amplifiers 121 and 122, band pass filters (BPFs) 131 and 132, and a signal processing device (an information processing device) 150.

The ultrasonic sensor 111 is provided in the air (a medium) adjacent to the structure 10 at the surface 10A and selectively detects surface waves 202 that are excited when elastic waves generated in the source 200 inside the structure 10 have reached the surface 10A. To selectively detect the surface waves 202 on the basis of a principle to be described below, the ultrasonic sensor 111 includes a directional ultrasonic sensor (a directional sensor) 113. The directional ultrasonic sensor 113 detects elastic waves (second elastic waves) 203 emitted to the air (the medium) adjacent to the structure 10 at the surface 10A when the elastic waves have reached the surface 10A and selectively detects elastic waves 203 generated from the surface waves 202 as described below. The AE sensor 112 is provided on the surface 10A and detects elastic waves. Also, a detector other than the directional ultrasonic sensor 113 may be used for the ultrasonic sensor 111 as long as it is possible to selectively detect the surface waves 202 as described below.

Next, a first principle for obtaining information about a depth D of the source 200 using the surface waves 202 will be described. FIG. 1 is a side view for describing elastic waves generated in the structure 10. When a crack occurs in a solid material of the structure 10 due to fatigue cracks, ground vibration, or external force, elastic waves are generated using a local position where the crack has occurred or the deepest position from the surface 10A as the source 200 as shown in FIG. 1. These elastic waves propagate through the structure 10 at a velocity specific to the solid material. Waves which travel through the structure 10 include body waves 201 which propagate radially from the source 200 and surface waves 202 which travel along the surface 10A. The body waves include P waves (which may be referred to as longitudinal waves) 221 and S waves (which may be referred to as transverse waves). The surface waves include Love waves and Rayleigh waves 232.

When a Poisson ratio v of the solid material of the structure 10 is positive, a velocity of the P waves 221 is denoted by $V_p$, a velocity of the S waves is denoted by $V_s$, and a velocity of the Rayleigh waves is denoted by $V_r$, relationships shown in the following Eqs. (1-1) and (1-2) are satisfied.

$$\frac{V_p}{V_s} = \sqrt{\frac{1+v}{1-2v}} \quad (1-1)$$

$$V_r \approx \frac{0.87 + 1.12v}{1+v} \cdot V_s \quad (1-2)$$

When the solid material which forms the structure 10 is concrete, the Poisson ratio v is about 0.2. When the velocity $V_p$ of the P waves 221 is set as a reference, the velocity $V_r$ of the Rayleigh waves 232 is expressed by the following Eq. (1-3).

$$V_r = 0.645 \cdot V_p \quad (1-3)$$

As shown in Eq. (1-3), the velocity $V_r$ of the Rayleigh waves 232 is about 65% of the velocity of the P waves 221. Based on the above description, attention will be paid to AE generated from the source 200 inside the structure 10.

The AE sensor 112 is provided at an arrival position 115 on the surface 10A and detects the P waves 221 that directly propagate from the source 200 in the initial motion. Hereinafter, P waves 222 are P waves that reach the AE sensor 112 directly and at the shortest distance from the source 200 among the P waves 221. P waves 223 are P waves 221 other than the P waves 222 and reach the surface 10A before detection. In FIG. 1, examples of P waves 223-1 and 223-2 among the P waves 223 are shown. The P waves 223-1 propagate from the source 200 in a traveling direction tilted at an angle θ with respect to a normal line 12 to the surface 10A and reach the surface 10A at an arrival position 116. The P waves 223-2 propagate from the source 200 in parallel to the normal line 12 to the surface 10A and reach the surface 10A at an arrival position 117. That is, the traveling direction of the P waves 223-2 is not tilted at 0° with respect to the normal line to the surface 10A.

In the first embodiment, the Rayleigh waves 232 are used as the surface waves 202. In FIG. 1, examples of Rayleigh waves 232-1 and 232-2 among the Rayleigh waves 232 are shown. The Rayleigh waves 232-1 originate from the arrival position 116 and propagate along the surface 10A. The Rayleigh waves 232-2 originate from the arrival position 117 and propagate along the surface 10A.

When the solid material which forms the structure 10 is concrete, the velocity $V_p$ of the P waves 222 is about 4000 m/s. The P waves 223-1 and 223-2 emitted from the source 200 simultaneously with the P waves 222 reach the surface 10A at the arrival positions 116 and 117 and are subjected to conversion into the Rayleigh waves 232-1 and 232-2 (hereinafter referred to as P-R conversion).

In the P-R conversion, the Rayleigh waves 232 are generated most efficiently under the condition that a component of a wavelength of the P waves 223 incident on the normal line to the surface 10A at the angle θ in a horizontal direction (for example, a direction parallel to the surface 10A) matches a wavelength of the Rayleigh waves 232. That is, the efficiency of the Rayleigh waves 232 is maximized when the following Eq. (1-4) is satisfied.

$$V_p \sin \theta = V_r \quad (1-4)$$

When Eq. (1-4) is satisfied, an angle $\theta_{opt}$ at which the traveling direction of the Rayleigh waves 232 that have been generated efficiently is tilted with respect to the normal line to the surface 10A is expressed by the following Eq. (1-5).

$$\theta_{opt} = \arcsin\left(\frac{V_r}{V_p}\right) \approx 40.1 [deg.] \quad (1-5)$$

Considering the velocity $V_p$ of the P waves 222 and the velocity $V_r$ of the Rayleigh waves 232 in concrete, as shown in Eq. (1-5), the Rayleigh waves 232 are most efficiently generated according to the P waves 223 which propagate from the source 200 in the traveling direction tilted at about 40.1 [deg.] with respect to the normal line to the surface 10A. Hereinafter, it is assumed that the traveling direction of the P waves 223-1 shown in FIG. 1 from the source 200 is tilted at an angle $\theta_{opt}$ with respect to the normal line 12 to the surface 10A and the Rayleigh waves 232-1 are generated most efficiently among the Rayleigh waves 232.

Here, a separation distance between the source 200 and the AE sensor 112 in the horizontal direction is denoted by L. The separation distance between the source 200 and the arrival position 115 is denoted by $l_p$. The separation distance between the source 200 and the arrival position 116 is denoted by $l_{p\_r}$. The separation distance between the arrival position 115 and the arrival position 116 is denoted by $l_{r\_r}$. The depth from the surface 10A to the source 200 is denoted by D. As shown in FIG. 1, the following Eqs. (1-6) and (1-7) are obtained as geometrically determined distances.

$$l_p = \sqrt{L^2 + D^2} \quad (1-6)$$

$$L - l_{r\_r} = D \cdot \tan \theta \quad (1-7)$$

Figure 3:
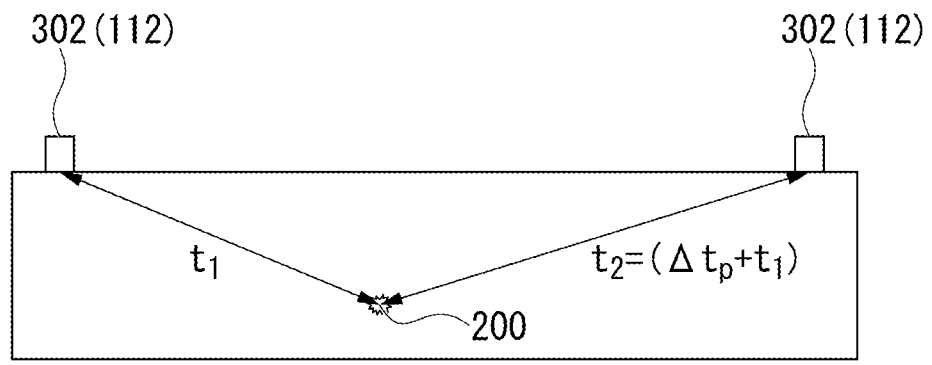
FIG. 3 is a side view showing an example of a configuration in which position evaluation analysis is performed.

The separation distance L is obtained through conventional position evaluation analysis on the basis of an arrival time difference ($\Delta t_p$) of the P waves 221 to a plurality of sensors 302 (for example, which may also serve as the AE sensor 112) disposed on the surface 10A (see FIG. 3). As a result, the separation distance L is obtained as a function of the depth D of the source 200 from the surface 10A. The arrival time difference $\Delta t_{p\_r}$ between the time when the P waves 222 from the source 200 directly arrive at the AE sensor 112 and the time when the Rayleigh waves 232-1 into which the P waves 223-1 from the source 200 that have arrived at the arrival position 116 on the surface 10A have been converted through the P-R conversion arrive at the AE sensor 112 is obtained by the above-described various geometrically obtained distances and a difference in running time calculated from a velocity at which each wave propagates. That is, the arrival time difference $\Delta t_{p-r}$ is expressed by the following Eq. (1-8).

$$\Delta t_{p-r} = \left\{\left(\frac{l_{p-r}}{v_p}\right)+\left(\frac{l_{r-r}}{V_r}\right)\right\} - \frac{l_p}{V_p} = \frac{1.308 \cdot D - \sqrt{L^2+D^2}}{V_p} + \frac{L - 0.843 \cdot D}{V_p \cdot 0.645} = \frac{1}{V_p}\left(\sqrt{L^2+D^2} - 1.0233 e^{-3} \cdot D - 1.5504 \cdot L\right) \quad (1-8)$$

Figure 4:
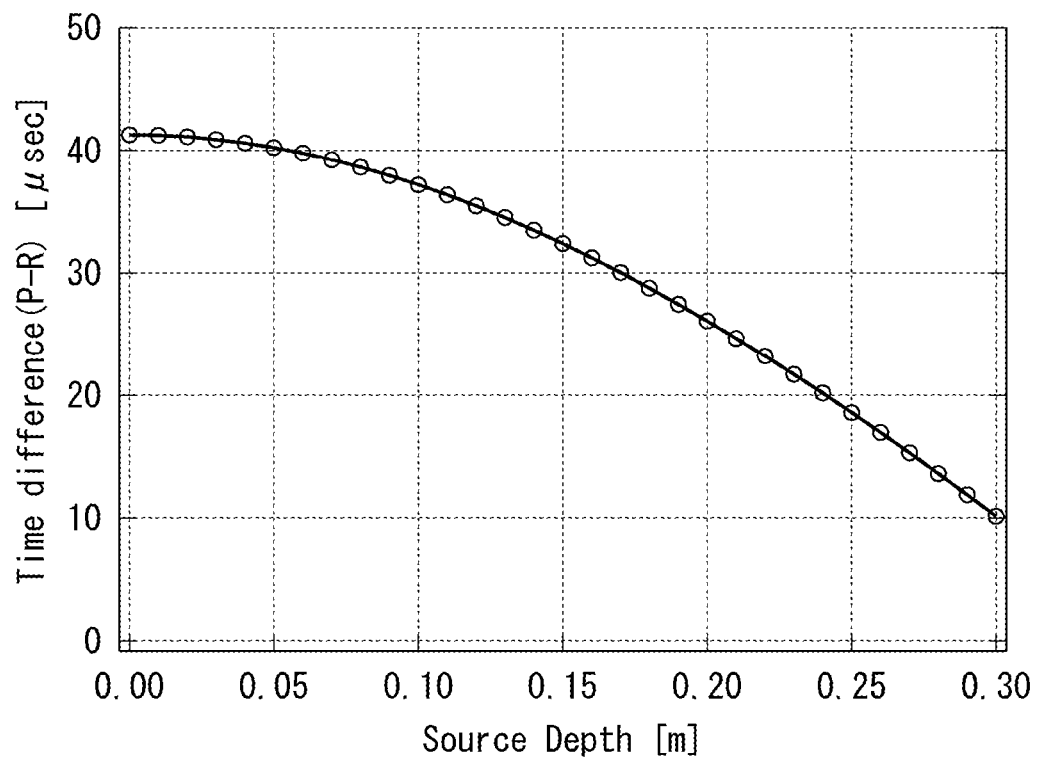
FIG. 4 is a graph showing a numerical calculation result of a change in an arrival time difference with respect to a depth of a source within the structure.

For example, when the separation distance L is 300 mm, the change in the arrival time difference $\Delta t_{p-r}$ with respect to the change in the depth D is represented by the graph shown in FIG. 4. As can be seen from the graph shown in FIG. 4, the depth D from the surface 10A of the source 200 can be calculated on the basis of the arrival time difference $\Delta t_{p-r}$ between the P waves 222 which are the body waves 201 and the Rayleigh waves 232-1 which are the surface waves 202.

Figure 5:
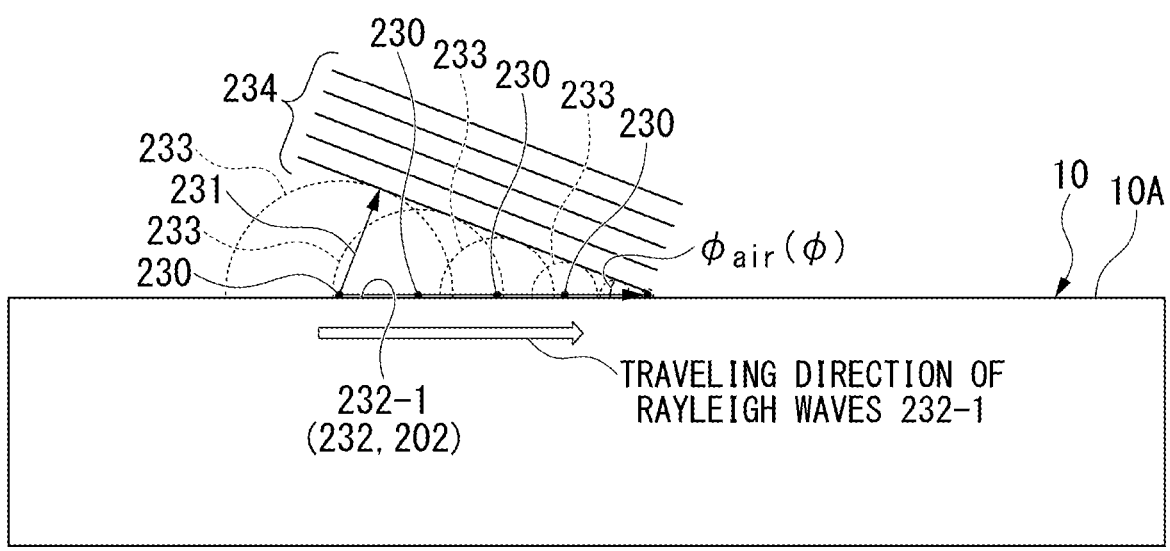
FIG. 5 is a side view for describing sound waves emitted from a surface of the structure.

Next, a phenomenon in which sound waves (second elastic waves) are emitted into the air adjacent to the structure through the propagation of elastic waves will be described. When the Rayleigh waves 232-1 are generated on the surface 10A as described in the first principle described above, atoms or molecules of the solid material of the structure 10, which interfaces with the surface 10A overlapping a path of the Rayleigh waves 232-1, and atoms or molecules in the vicinity thereof vibrate. Using individual vibrations of atoms or molecules of the solid material as a point sound source 230, sound waves (second elastic waves) 231 are emitted into the air adjacent to the structure 10 at the surface 10A, as shown in FIG. 5, according to the Huygens-Fresnel principle. The sound waves 231 diffuse and propagate into the air at a velocity of sound (the velocity of the second elastic waves) $V_{air}$. The point sound source 230 propagates through the structure 10 along the surface 10A at a velocity $V_{ae}$. The velocity $V_{ae}$ at which the point sound source 230 propagates through the structure 10 corresponds to the velocity $V_r$ of the Rayleigh waves 232-1 described above. Also, only some point sound sources 230 and sound waves 231 among point sound sources 230 which propagate in an arrow direction and sound waves 231 emitted from the point sound sources 230 are shown in FIG. 5. A broken line in FIG. 5 indicates a wave surface 233 in phase with the sound waves 231 emitted from each of the point sound sources 230.

When a time period from time t to time t' has elapsed, the sound waves 231 emitted from each of the plurality of point sound sources 230 during propagation form a wave surface 234 in phase on a line tilted at an angle ϕ in side view with respect to the surface 10A. The angle ϕ is expressed as shown in the following Eq. (1-A).

$$\phi = \arcsin\left(\frac{V_{air}}{V_{ae}}\right) \quad (1\text{-}A)$$

When the solid material which forms the structure 10 is concrete, the velocity $V_p$ of the Rayleigh waves 232 is about 2578 m/s because the velocity $V_p$ is about 4000 m/s as described above. Assuming that the sound velocity $V_{air}$ in the air is 340.29 m/s, the angle $\phi_{air}$ is expressed as shown in the following Eq. (1-9) on the basis of the above-described Eq. (1-A).

$$\phi_{air} \approx 8.01 [\text{deg.}] \quad (1\text{-}9)$$

Figure 6:
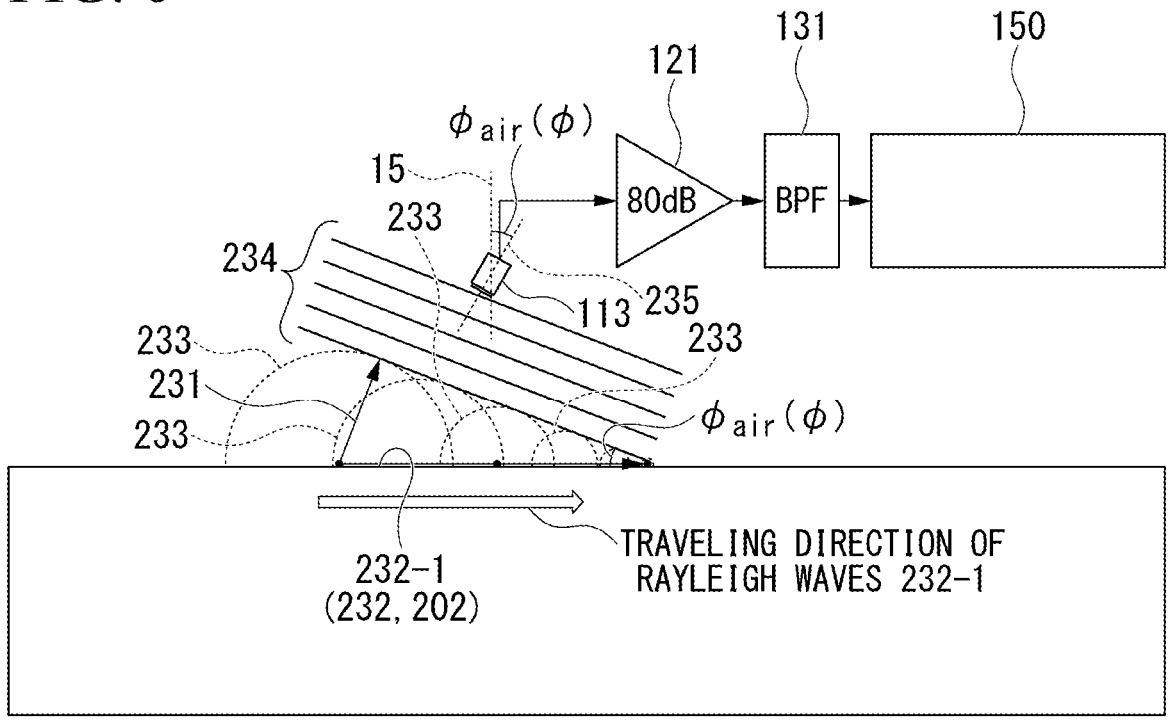
FIG. 6 is a side view showing an example of a configuration in which the sound waves emitted from the surface of the structure are detected.

As described above, the sound waves 231 are generated from the Rayleigh waves 232-1 in the air in accordance with the propagation of the P waves 223-1 from the source 200 in the structure 10. Also, the angle ϕ at which the wave surface 234 of the sound waves 231 is tilted with respect to the surface 10A is determined by a ratio between the velocity $V_p$ at which the P waves 221 propagate through the structure 10 and the sound velocity $V_{air}$ in the air. Therefore, as shown in FIG. 6, the directional ultrasonic sensor 113 is disposed in the air in a state in which the detection direction has been tilted in accordance with the angle ϕ with respect to the surface 10A, so that it is possible to detect the sound waves 231-1 generated from the Rayleigh waves 232-1 and selectively detect the Rayleigh waves 232-1 via the sound waves 231. That is, a reception axis (an axis line representing directivity) 235 representing a direction in which the directivity of the directional ultrasonic sensor 113 is maximized and which is substantially orthogonal to the wave surface 234 is tilted at an angle (a predetermined angle) ϕ with respect to a normal line 15 to the surface 10A of the structure 10. Specifically, the reception axis 235 is tilted at an angle of $\phi_{air} \pm 10°$ with respect to the normal line 15.

Next, the components of the measurement device 101 will be described in detail on the basis of the above description of the principle. As shown in FIG. 1, the directional ultrasonic sensor 113 is tilted at an angle $\phi_{air}$ with respect to the normal line 15 to the surface 10A of the structure 10 and detects sound waves 231 emitted from the surface 10A. The reception axis 235 representing a detection direction of the directional ultrasonic sensor 113 is tilted at the angle $\phi_{air}$ with respect to the normal line 15 and the sound waves 231 caused by the Rayleigh waves 232-1 are selectively detected. The directional ultrasonic sensor 113 converts the detected sound waves 231 into a voltage signal and outputs the voltage signal. As the directional ultrasonic sensor 113, a known ultrasonic sensor having directivity can be used. As the directional ultrasonic sensor 113, for example, a reception-only type ultrasonic sensor capable of detecting only sound waves from a physical object which is a measurement target is more preferable than a transmission/reception type ultrasonic sensor that transmits ultrasonic waves from itself to a physical object which is a measurement target and detects reflected waves thereof as known. A sound pressure half-angle (a half-value angle) of the directional ultrasonic sensor 113 is preferably 0° or more and 10° or less. The directional ultrasonic sensor 113 preferably has peak sensitivity in a range of 10 kHz or more and 1 MHz or less.

The AE sensor 112 detects the P waves 222 at a predetermined position (for example, the arrival position 115 in FIG. 2) where the P waves 222 generated from the source 200 arrive at the surface 10A. As shown in FIG. 1, the AE sensor 112 has a piezoelectric element, converts the detected P waves 222 into a voltage signal, and outputs the voltage signal. The AE sensor 112 preferably includes a piezoelectric element having sensitivity in a range of, for example, 10 kHz or more and 1 MHz or less. As the AE sensor 112, any types of AE sensors such as a resonance type AE sensor having a resonance peak within the frequency range described above and a wideband type AE sensor in which resonance is minimized can be used.

The amplifier 121 amplifies the voltage signal related to the sound waves 231 output from the directional ultrasonic sensor 113 with a predetermined gain (for example, a voltage gain). The amplifier 122 amplifies the voltage signal related to the P waves 222 output from the AE sensor 112 with a predetermined gain (for example, a voltage gain). The predetermined gain of the amplifier 121 and the predetermined gain of the amplifier 122 are appropriately set in consideration of a relative ratio between an amplitude or an intensity of the sound waves 231 and an amplitude or an intensity of the P waves 222 and the like. For example, when the gain of the amplifier 121 is 80 [dB], the gain of the amplifier 122 may be 40 [dB]. In such a setting, even if an output voltage output from the directional ultrasonic sensor 113 with respect to the sound waves 231 is lower than an output voltage output from the AE sensor 112 with respect to the P waves 222, the accuracy of a process or calculation in the signal processing device 150 to be described below is not degraded. Also, the amplifier 121 may be embedded in the directional ultrasonic sensor 113. The amplifier 122 may be embedded in the AE sensor 112.

The BPFs 131 and 132 receive the voltage signals amplified and output by the amplifiers 121 and 122, remove noise components outside a predetermined band of the input voltage signals, and output the voltage signals within the predetermined band. The types of BPFs 131 and 132 are not particularly limited as long as they are BPFs capable of performing the above-described operations.

The signal processing device 150 calculates a depth D of the source 200 of the P waves 221 within the structure 10 on the basis of the information about the Rayleigh waves 232-1 detected by the directional ultrasonic sensor 113 and the information about the P waves 222 detected by the AE sensor 112. The signal processing device 150 includes a first processor 151, a second processor 152, a third processor 153, and a fourth processor 154. For example, the first to fourth processors 151, 152, 153, and 154 may be calculators configured to enable processes or calculations to be described below to be executed or the like or may be large-scale integration (LSI) circuits configured to execute processes or calculations or computers in which a program configured to execute processes or calculations is embedded.

The first processor 151 determines a time of arrival (TOA) of the sound waves 231 on the basis of the voltage signal output from the BPF 131. More specifically, the signal processing device 150 generates cumulative time information from the time when the entire device is powered on the basis of a signal from a clock source (not shown). The first processor 151 detects information of the time when the voltage signal output from the BPF 131 has been received on the basis of the above-described cumulative time information and determines and outputs the TOA of the sound waves 231.

The second processor 152 determines the TOA of the P waves 222 on the basis of the voltage signal output from the BPF 132. Similar to the first processor 151, the second processor 152 detects time information of the time when the voltage signal output from the BPF 132 has been received on the basis of the cumulative time information based on the signal from the clock source (not shown) and determines and outputs the TOA of the P waves 222.

The third processor 153 receives the information of the TOA of the sound waves 231 output from the first processor 151 and the information of the TOA of the P waves 222 output from the second processor 152 and calculates an arrival time difference $\Delta t_{p-r}$ on the basis of the received information. The "time when the P waves 222 generated from the source 200 directly arrive at the AE sensor 112" when the arrival time difference $\Delta t_{p-r}$ is calculated corresponds to the TOA of the P waves 222. For example, the time when "Rayleigh waves 232-1 into which P waves 223-1 have been converted through the P-R conversion arrive at the AE sensor 112 after the arrival of P waves 223-1 generated from the source 200 at the arrival position 116 on the surface 10A" when the arrival time difference $\Delta t_{p-r}$ is calculated can be calculated on the basis of the TOA of the sound waves 231.

The TOA of the sound waves 231 output from the first processor 151 includes the time when the P waves 223-1 have propagated from the source 200 to the arrival position 116 and the time until the sound waves 231 emitted from the arrival position 116 (i.e., the surface 10A) into the air are detected by the directional ultrasonic sensor 113. A physical property parameter related to a type of solid material of the structure 10, a sound velocity $V_{air}$, an angle $\phi_{air}$, and a height from the surface 10A to a position where the directional ultrasonic sensor 113 is installed are known. The third processor 153 uses these known parameters to calculate a propagation time period of the sound waves 231 from the surface 10A to the directional ultrasonic sensor 113. The third processor 153 can acquire the remaining time period obtained by subtracting the propagation time period of the sound waves 231 from the TOA of the sound waves 231 output from the first processor 151 as a time period in which the P waves 223-1 have propagated from the source 200 to the arrival position 116.

The separation distance L between the arrival position 115 and the arrival position 117 is calculated through the position evaluation analysis using the AE sensor 112 and an AE sensor (not shown) provided on the surface 10A. The third processor 153 can appropriately receive voltage signals from the plurality of AE sensors described above and calculate the separation distance L by itself. Also, the third processor 153 may receive the separation distance L calculated by another processor (for example, a processor within an analysis device that executes the position evaluation analysis in the plurality of AE sensors described above) or the like from the other processor. If the separation distance $l_{r-r}$ is calculated on the basis of the separation distance L using a geometric relationship shown in FIG. 2 and the like and the velocity $V_r$ of the Rayleigh waves 232-1 is used, the time when the Rayleigh waves 232-1 after the conversion obtained through the P-R conversion at the arrival position 116 arrive at the AE sensor 112 is calculated. The third processor 153 calculates an arrival time difference $\Delta t_{p-r}$ according to a sum of the above-described "time when the P waves 223-1 propagates from the source 200 to the arrival position 116" and the above-described "time when the Rayleigh waves 232-1 from the arrival position 116 arrive at the AE sensor 112 (i.e., the arrival position 115)" and outputs the calculated arrival time difference $\Delta t_{p-r}$.

The fourth processor 154 receives information of the arrival time difference $\Delta t_{p-r}$ output from the third processor 153 and information of the separation distance L output from the third processor 153 or another processor and calculates a depth D on the basis of the received information. Specifically, the fourth processor 154 substitutes the received arrival time difference $\Delta t_{p-r}$ and the separation distance L into the above-described Eq. (9) to calculate the depth D of the source 200 from the surface 10A. The fourth processor 154 may output and display the calculated depth D to a display device such as an attached display (for example, a liquid crystal display or an organic EL display) (not shown) or may transmit the calculated depth D to another display device (not shown) in a wired or wireless mode to cause the other display device to display the calculated depth D.

According to the above-described configuration and processes and the like, the measurement device 101 obtains information about the depth D of the source 200 of the P waves 221 within the structure 10 on the basis of information of a TOA of the sound waves 231 detected by the directional ultrasonic sensor 113.

Next, a measurement method of measuring the depth D of the source 200 using the measurement device 101 will be described.

Figure 7:
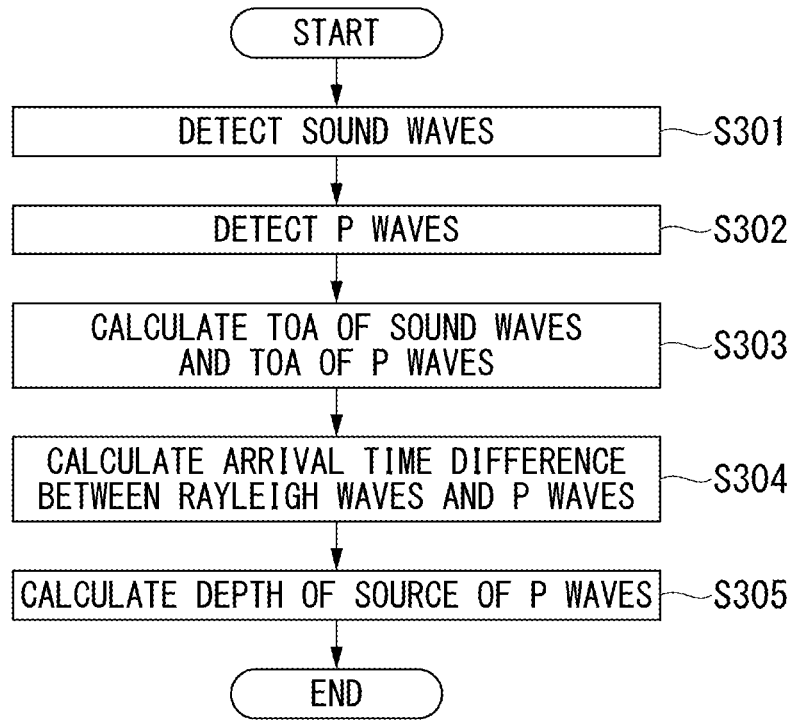
FIG. 7 is a flowchart showing an example of a flow of a measurement method according to the first embodiment.

FIG. 7 is a flowchart showing an example of a flow of the measurement method of the first embodiment. As shown in FIG. 7, the sound waves 231 are initially detected using the directional ultrasonic sensor 113 in which the reception axis 235 is tilted at an angle $\theta_{air}$ with respect to the normal line 15 in the air above the surface 10A of the structure 10 (step S301). Subsequently, the P waves 222 are detected using the AE sensor 112 provided at the arrival position 115 on the surface 10A of the structure 10 (step S302). Also, steps S301 and S302 may be performed at the same time or may be performed in a reverse order which is the reverse of the above-described order.

Next, a TOA of the sound waves 231 and a TOA of the P waves 222 are calculated (step S303). On the basis of the calculated TOAs of the waves, an arrival time difference $\Delta t_{p-r}$ between the Rayleigh waves 232-1 for generating the sound waves 231 and the P waves 222 is calculated (step S304). The depth D of the source 200 is calculated by substituting the calculated arrival time difference $\Delta t_{p-r}$ and the separation distance L previously obtained through the position evaluation analysis into the above-described Eq. (1-8) (step S305).

According to the above-described flow, it is possible to obtain information about the depth D of the source 200 of the P waves 221 within the structure 10 on the basis of the TOA information of the sound wave 231 detected using the directional ultrasonic sensor 113.

As described above, the measurement device 101 of the first embodiment includes an ultrasonic sensor 111, an AE sensor 112, and a signal processing device 150. For example, the ultrasonic sensor 111 selectively detects the Rayleigh waves (the surface waves) 232-1 that are excited through the P-R conversion when the P waves (the first elastic waves) 223-1 generated inside the structure 10 formed of the solid material such as concrete have reached the surface 10A of the structure 10. The AE sensor 112 is provided at the arrival position 115 on the surface 10A of the structure 10 and detects the P waves 222 which directly propagate from the source 200. The signal processing device 150 obtains information about the depth D of the source 200 of the P waves 221 within the structure 10 on the basis of the information of the TOA of the Rayleigh waves 232-1 detected by the ultrasonic sensor 111.

According to the measurement device 101 of the first embodiment, the ultrasonic sensor 111, the AE sensor 112, and the signal processing device 150 are provided, so that it is possible to calculate the arrival time difference $\Delta t_{p-r}$ between the Rayleigh waves 232-1 for generating the sound waves 231 and the P waves 222 and it is possible to measure the depth D of the source 200 (i.e., the damage source) such as a crack within the structure 10 having a thickness of a predetermined value or more for which measurement is difficult in the conventional method such as position evaluation analysis.

In the measurement device 101 of the first embodiment, the ultrasonic sensor 111 includes the directional ultrasonic sensor (the directional sensor) 113 configured to detect the sound waves (the second elastic waves) 231 emitted to the air adjacent to the structure 10 at the surface 10A when the P waves 223-1 have reached the surface 10A. The reception axis (an axis line representing directivity) 235 of the directional ultrasonic sensor 113 is tilted at an angle θ (specifically, an angle $\theta_{air}$) with respect to the normal line 15 to the surface 10A. The angle θ is expressed by the above-described Eq. (1) and is determined by the velocity $V_{air}$ of the sound waves and the velocity $V_r$ of the Rayleigh waves 232.

According to the measurement device 101 of the first embodiment, the directional ultrasonic sensor 113 is provided. The directional ultrasonic sensor 113 can be disposed in alignment with the reception axis 235 in a traveling direction of the emitted sound waves 231 tilted at a predetermined angle with respect to the surface 10A. Thereby, the selectivity of the sound wave 231 detected by the directional ultrasonic sensor 113 can be improved as compared with when the reception axis 235 is not aligned in the traveling direction of the sound waves 231. Also, according to the measurement device 101 of the first embodiment, because a predetermined angle is determined by the velocity $V_{air}$ of the sound waves and the velocity $V_r$ of the Rayleigh waves 232 as in Eq. (1), it is possible to improve selectivity of the sound waves 231 detected by the directional ultrasonic sensor 113 in accordance with a type of a solid material of the structure 10 and a medium adjacent to the structure 10 at the surface 10A.

According to the measurement method of the first embodiment, the sound waves 231 caused by the Rayleigh waves 232-1 which are the surface waves 202 are detected in addition to the P waves 223-1, so that it is possible to execute measurement related to a depth D whose measurement is difficult in a measurement method of detecting only elastic waves without detecting the Rayleigh waves or the sound waves.

Next, examples of the measurement device 101 of the first embodiment will be described. Also, a configuration of the measurement device 101 is not limited to conditions and numerical values used in the examples to be described below.

As shown in FIG. 1, a concrete structure having a certain thickness along the surface 10A and a depth measurement device having a configuration similar to that of the measurement device 101 were provided. The thickness of the concrete structure (i.e., a size in a direction along the normal line 15) was 180 [mm]. Cracks occurred at five locations where a depth D of the concrete structure was different from that of the concrete structure in plan view, and elastic wave sources 1 to 5 were formed. A commercially available directional ultrasonic sensor was used as a directional ultrasonic sensor of the depth measurement device. A commercially available AE sensor was used as the AE sensor of the depth measurement device and the AE sensor for position evaluation analysis.

Figure 8:
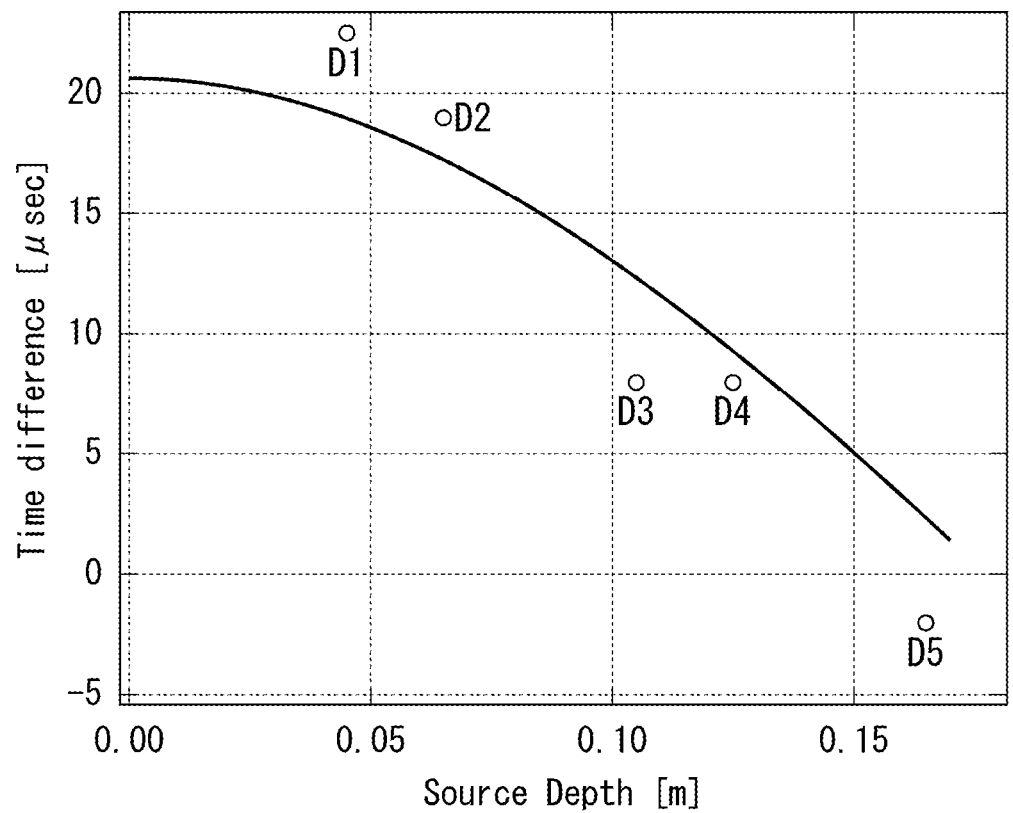
FIG. 8 is a graph showing a relationship between an arrival time difference measured using the measurement device of the first embodiment and a calculated depth of the source within the structure.

FIG. 8 is a graph in which the vertical axis is plotted as an arrival time difference between a TOA of P waves directly detected from the source and a TOA of sound waves caused by P waves, which travel from the source in a direction tilted at about 40.1 [deg.] with respect to a normal line to the surface of the concrete structure, and the horizontal axis is plotted as a depth of a source from the surface in the concrete structure with respect to the sources 1 to 5 formed in the above-described concrete structure. A solid line in the graph of FIG. 8 indicates a theoretical value when a physical property value of concrete serving as a fixing material of the structure was used.

Arrival time differences were calculated on the basis of the measured TOA of the sound waves and the measured TOA of the P waves with respect to the sources 1 to 5. Results of calculating the arrival time differences were source 1; 22.5 [μs], source 2; 19 [μs], source 3; 8 [μs], source 4; 8 [μs], and source 5; −2 [μs] with respect to a time set as a reference. Also, a separation distance between the source and the AE sensor was set to 90 [mm] in the direction along the surface of the concrete structure. Based on the arrival time differences and the separation distance, results of measuring depths D1 to D5 of the sources 1 to 5 formed in the concrete structure were D1=0.045 [m], D2=0.065 [m], D3=0.105 [m], D4=0.125 [m], and D5=0.165 [m]. As shown in FIG. 8, it was confirmed that the arrival time differences changed in accordance with the depths D1 to D5. That is, it was confirmed that the depth of the source can be calculated from the arrival time difference.

Figure 9:
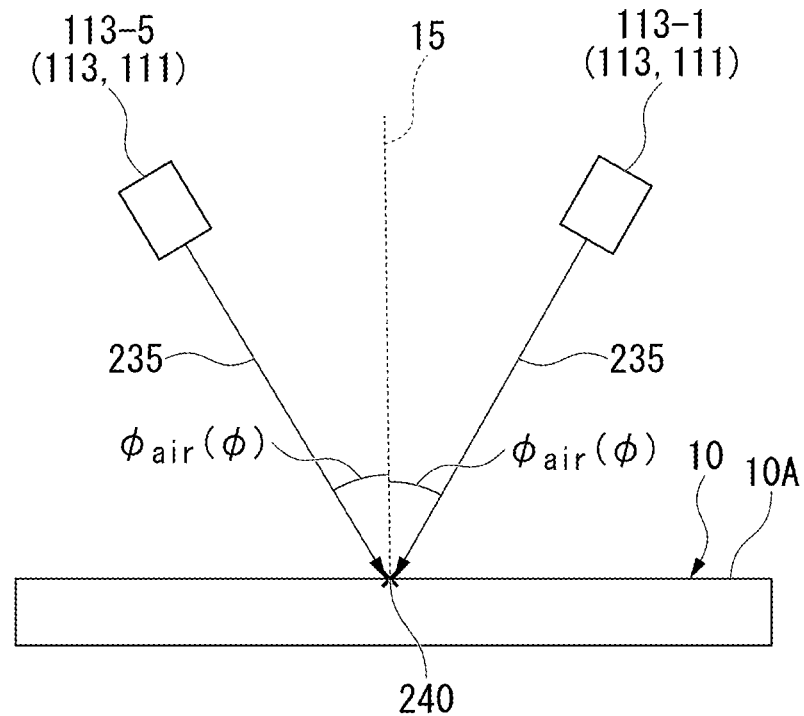
FIG. 9 is a side view showing an example of a configuration of a first modified example of the first embodiment.
Figure 10:
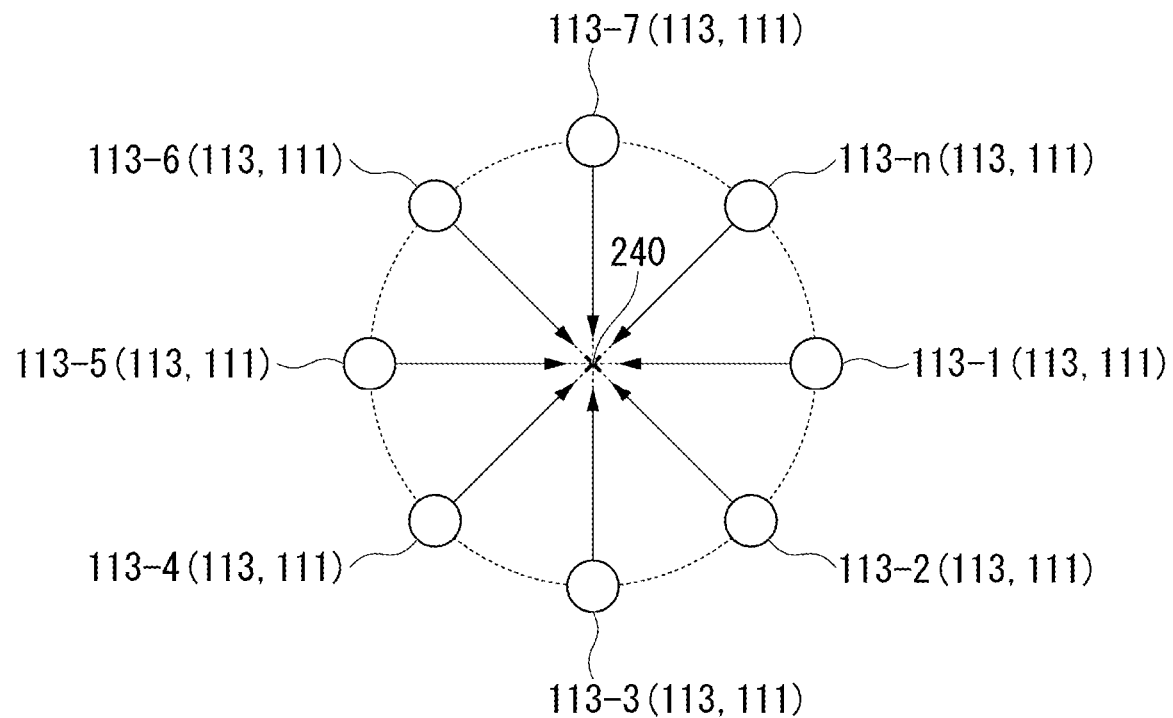
FIG. 10 is a plan view showing the example of the configuration of the first modified example of the first embodiment.

Next, a first modified example of the measurement device 101 of the first embodiment will be described. FIG. 9 is a side view showing a configuration of the first modified example of the measurement device 101. FIG. 10 is a plan view showing the configuration of the first modified example of the measurement device 101. Although the measurement device 101 of the first embodiment includes one directional ultrasonic sensor 113, a plurality of directional ultrasonic sensors 113-1, . . . , 113-$n$ may be provided as shown in FIGS. 9 and 10 in the first modified example. In FIG. 10, eight (i.e., n=8) directional ultrasonic sensors 113-1, . . . , 113-$n$ are shown as an example. Also, the number of directional ultrasonic sensors 113 may be a value other than 8 and is not limited to a specific number. In the following description, when a description common to the directional ultrasonic sensors 113-1, . . . , 113-$n$ is given, reference signs of these directional ultrasonic sensors are collectively referred to as 113$n$.

As shown in FIG. 9, the reception axis 235 of the directional ultrasonic sensor 113$n$ is tilted at an angle $\phi$ with respect to the normal line 15 and is tilted at an angle $\phi_{air}$ because the structure 10 is adjacent to the air at the surface 10A. That is, the direction in which the directional ultrasonic sensor 113$n$ detects the sound waves 231 is tilted at an angle $\phi$ in advance with respect to the normal line 15. The reception axis 235 of the directional ultrasonic sensor 113$n$ is concentrated at a predetermined center position 240 on the surface 10A and intersects the surface 10A at the center position 240. When the structure 10 is viewed in plan view along the normal line 15, the directional ultrasonic sensors 113$n$ are disposed at mutually equal intervals in a circumferential direction on a concentric circle (an annular line indicated by a broken line in FIG. 10) at the center position 240 as shown in FIG. 10. In other words, the sound waves 231 are detected from a plurality of positions (8 positions in FIG. 10) on an outer side in a radial direction and in a circumferential direction with respect to the center position 240 when viewed along the normal line 15.

According to the measurement device of the first modified example, when the directional ultrasonic sensors 113$n$ are provided, it is possible to efficiently detect sound waves 231 emitted from all directions in a surface direction (i.e., a horizontal direction) along the surface 10A without having to adjust an attitude of the directional ultrasonic sensor 113 as compared with when only one directional ultrasonic sensor 113 is provided.

Figure 11:
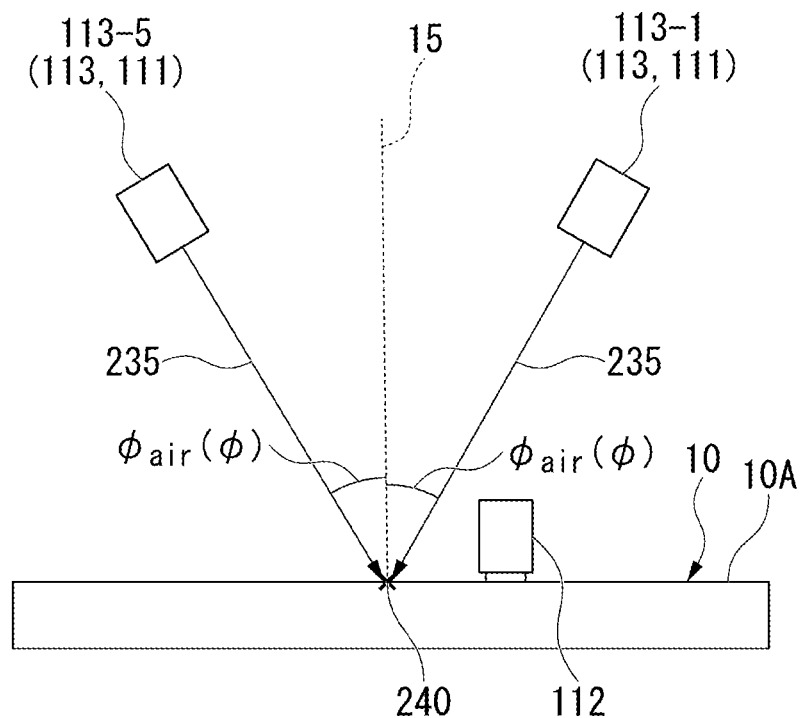
FIG. 11 is a side view showing an example of a configuration of a second modified example of the first embodiment.
Figure 12:
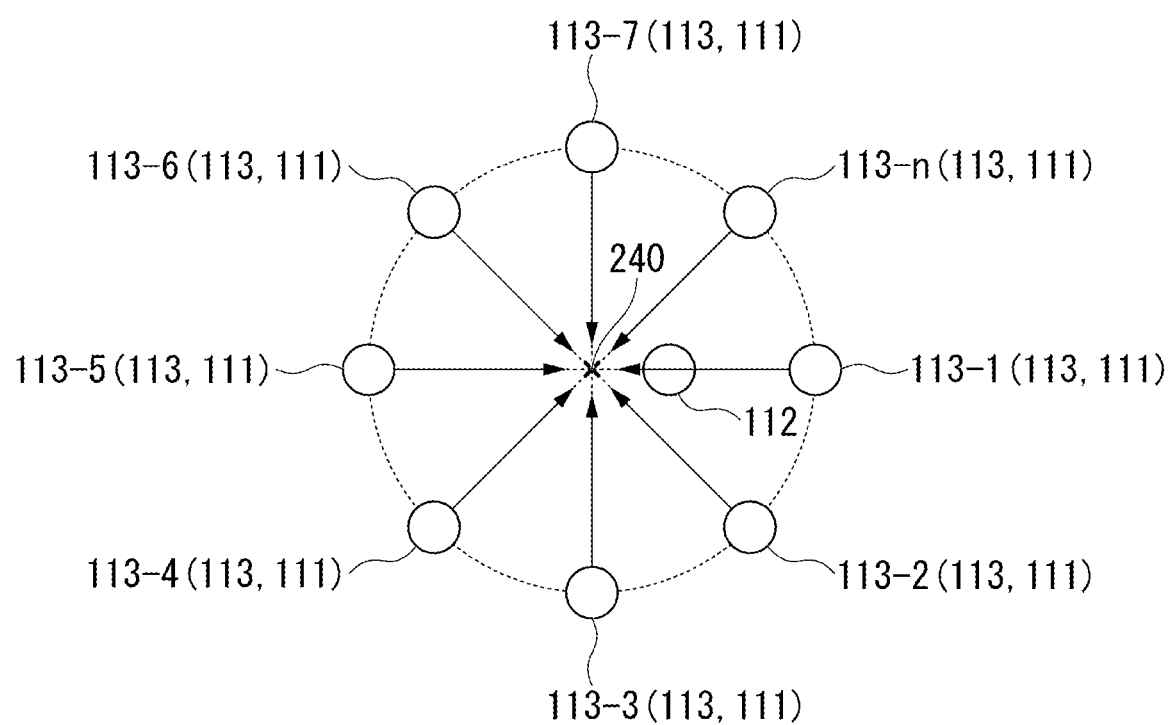
FIG. 12 is a plan view showing the example of the configuration of the second modified example of the first embodiment.

Next, a second modified example of the measurement device 101 of the first embodiment will be described. FIG. 11 is a side view showing a configuration of a second modified example of the measurement device 101. FIG. 12 is a plan view showing the configuration of the second modified example of the measurement device 101. In the second modified example, as in the first modified example, a plurality of directional ultrasonic sensors 113$n$ are provided. When the structure 10 is viewed in plan view along the normal line 15, the directional ultrasonic sensors 113$n$ are disposed at mutually equal intervals in a circumferential direction on a concentric circle (an annular line indicated by a broken line in FIG. 12) at the center position 240 as shown in FIG. 12.

In the second modified example, as shown in FIG. 11, the AE sensor 112 is disposed on the surface 10A near the center position 240 so that the AE sensor 112 does not intersect the reception axis 235 of each of the directional ultrasonic sensors 113$n$ and does not interfere with the detection of the sound waves 231 by the directional ultrasonic sensor 113$n$. Also, when the structure 10 is viewed in plan view along the normal line 15, the AE sensor 112 is disposed within a concentric circle along which the directional ultrasonic sensors 113$n$ are disposed. Thereby, according to the measurement device of the second modified example, the AE sensor 112 disposed within an area surrounded by the concentric circle along which the directional ultrasonic sensors 113$n$ are disposed is provided, an installation space of the device including the AE sensor 112 and the directional ultrasonic sensors 113$n$ can be reduced and the measurement device can be miniaturized.

In the first and second modified examples of the first embodiment, the directional ultrasonic sensors 113$n$ do not necessarily have to be disposed at mutually equal intervals on the concentric circle centered on the center position 240 and may be disposed at mutually different intervals. Also, the directional ultrasonic sensors 113$n$ may be disposed on a concentric frame having a shape other than a circle centered on the center position 240. For example, the directional ultrasonic sensors 113$n$ may be disposed in a rectangular shape centered on the center position 240 at intervals from each other. That is, the measurement device 101 of the first embodiment may include directional ultrasonic sensors 113$n$ radially disposed with respect to the predetermined center position 240 on the surface 10A when viewed along the normal line 15. When the measurement device 101 of the first embodiment includes the directional ultrasonic sensors 113$n$ disposed radially from the center position 240 in plan view as described above, sound waves 231 emitted in any direction on the surface 10A can be detected efficiently.

Second Embodiment

Next, the measurement device 102 and the measurement method of the second embodiment will be described. First, a second principle for obtaining information about the depth D of the source 200 using the surface waves 202 will be described.

Figure 2:
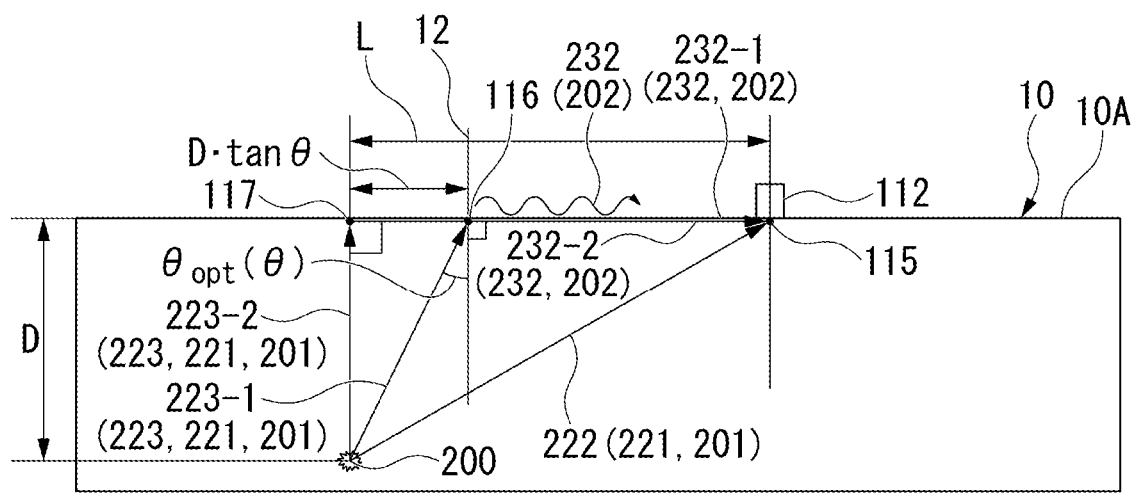
FIG. 2 is a side view for describing elastic waves generated in a structure.

It is known that the amplitude of the Rayleigh waves 232, which are the surface waves 202 shown in the example of FIG. 2, increases as the source 200 approaches the surface 10A. That is, the amplitude of the Rayleigh waves 232 increases as the depth D decreases. A similar trend to the Rayleigh wave is seen in AE.

For example, in the structure 10, the Rayleigh waves 232-1 generated from the P waves 223-1 emitted from the source 200 at a depth D11 (not shown) are detected. Subsequently, the Rayleigh waves 232-1 generated from the P waves 223-1 emitted from the source 200 at a depth D12 (not shown) are detected. When information about amplitudes of the detected Rayleigh waves 232-1 is detected and compared with each other, a relative relationship of whether the depth D11 is shallower or deeper than the depth D12 (information about the depth D and depth evaluation) is ascertained. Also, when a difference between the amplitude information of the Rayleigh waves 232-1 caused by the source 200 of the depth D13 (not shown) and the amplitude information of the Rayleigh waves 232-1 caused by the source 200 of the known depth is quantitatively evaluated, it is possible to quantitatively estimate a depth D13 in addition to a relative relationship between the depth D13 and the known depth.

Figure 13:
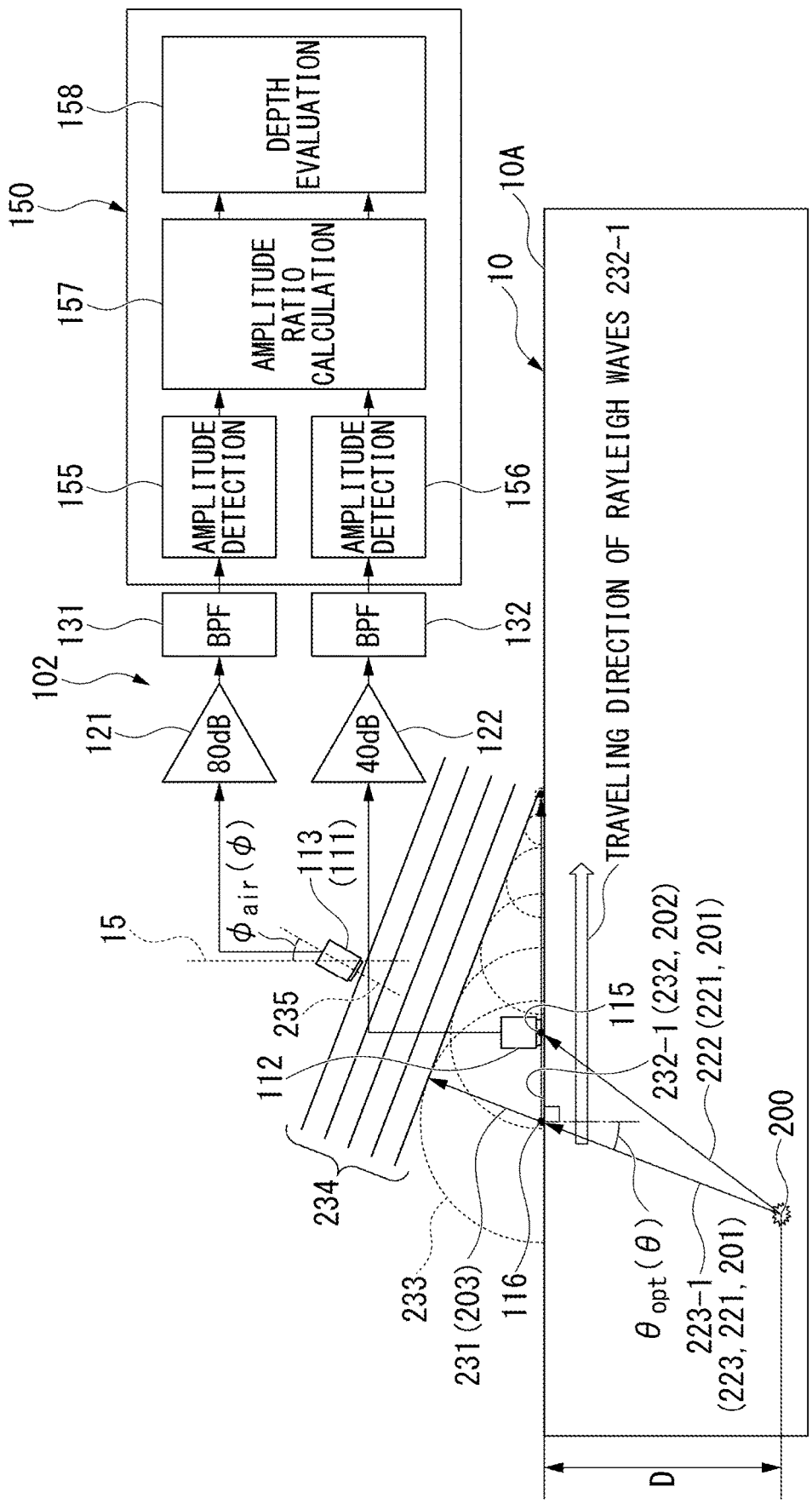
FIG. 13 is a side view showing an example of a configuration of a measurement device of a second embodiment.

FIG. 13 is a side view of the measurement device 102 of the second embodiment. As shown in FIG. 13, the measurement device 102 includes an ultrasonic sensor (a first detector) 111, an AE sensor (a second detector) 112, amplifiers 121 and 122, and bandpass filters (BPFs) 131, ..., 132, and a signal processing device (an information processing device) 150. In the second embodiment, the signal processing device 150 includes a fifth processor 155, a sixth processor 156, a seventh processor 157, and an eighth processor 158. For example, the fifth to eighth processors 155, 156, 157, and 158 may be calculators configured to enable processes, calculations, and the like to be described below to be executed or the like or may be LSI circuits configured to execute processes, calculations, and the like or computers in which a program configured to execute processes, calculations, and the like is embedded.

The fifth processor 155 detects amplitude information of the sound waves 231 on the basis of a voltage signal output from the BPF 131. The sixth processor 156 detects amplitude information of the P waves 222 on the basis of a voltage signal output from the BPF 132.

The seventh processor 157 receives amplitude information of the sound waves 231 output from the fifth processor 155 and amplitude information of the P waves 222 output from the sixth processor 156 and calculates an amplitude ratio or a physical quantity related to the amplitude on the basis of the received amplitude information. The eighth processor 158 evaluates the depth D on the basis of the amplitude ratio and the like output from the seventh processor 157, and calculates information and a physical quantity related to the depth D.

According to the above-described configuration and process and the like, the measurement device 102 obtains information of the depth D of the source 200 of the P waves 221 within the structure 10 on the basis of the amplitude information of the sound wave 231 detected by the directional ultrasonic sensor 113.

Figure 14:
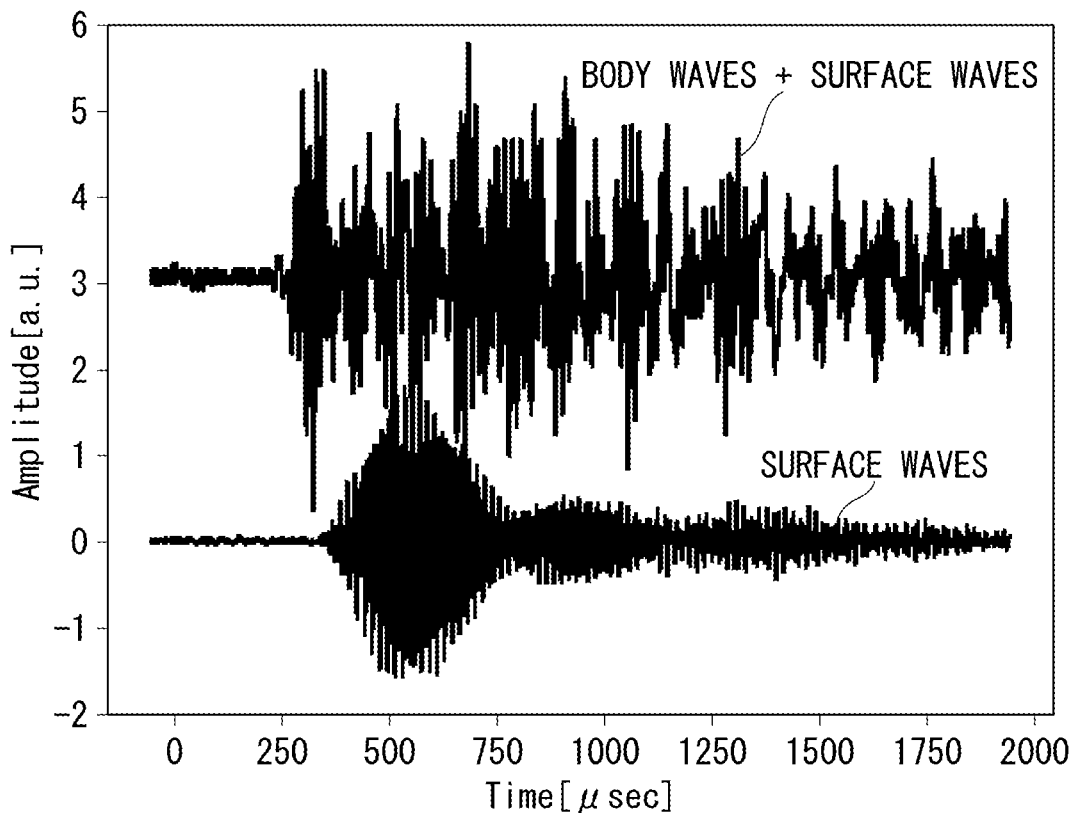
FIG. 14 is a graph showing numerical calculation results of changes over time in amplitude values of elastic waves and surface waves when a depth D11=65 mm.
Figure 15:
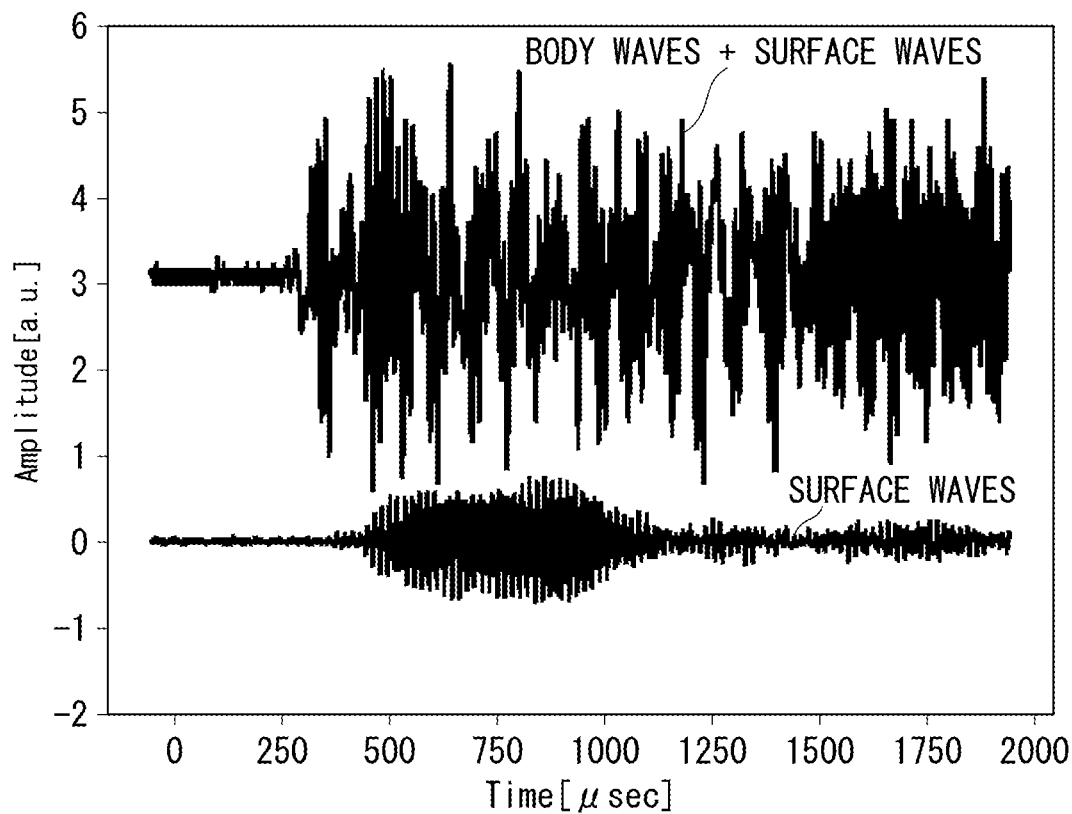
FIG. 15 is a graph showing numerical calculation results of changes over time in amplitude values of elastic waves and surface waves when a depth D11=165 mm.

As an example, when the solid material which forms the structure 10 is concrete and depths thereof are D11=65 mm [mm] and D12=165 [mm], composite waves, which include P waves (body waves) 223-1 and sound waves 231, and sound waves 231 caused by the Rayleigh waves 232-1, which are surface waves, were detected. The AE sensor 112 was used to detect composite waves including the P waves 223-1 and the sound wave 231. The sound waves 231 were detected using the directional ultrasonic sensor 113. FIG. 14 is a graph showing relationships between measurement times and amplitude values of waves when the composite waves and the sound waves 231 (shown as surface waves in the graph) are detected if the depth D11=65 mm [mm]. FIG. 15 is a graph showing relationships between measurement times and amplitude values of waves when the composite waves and the sound waves 231 are detected if the depth D12=165 mm [mm].

As shown in FIGS. 14 and 15, it was confirmed that an amplitude ratio of a maximum amplitude value of the sound waves to a maximum amplitude value of the composite waves in the case of the depth D11 is greater than an amplitude ratio at the depth D12. That is, it is possible to evaluate a relative relationship between depths D by comparing amplitude ratios of maximum amplitude values of the sound waves to maximum amplitude values of the composite waves for the sources 200 having different depths D.

Figure 16:
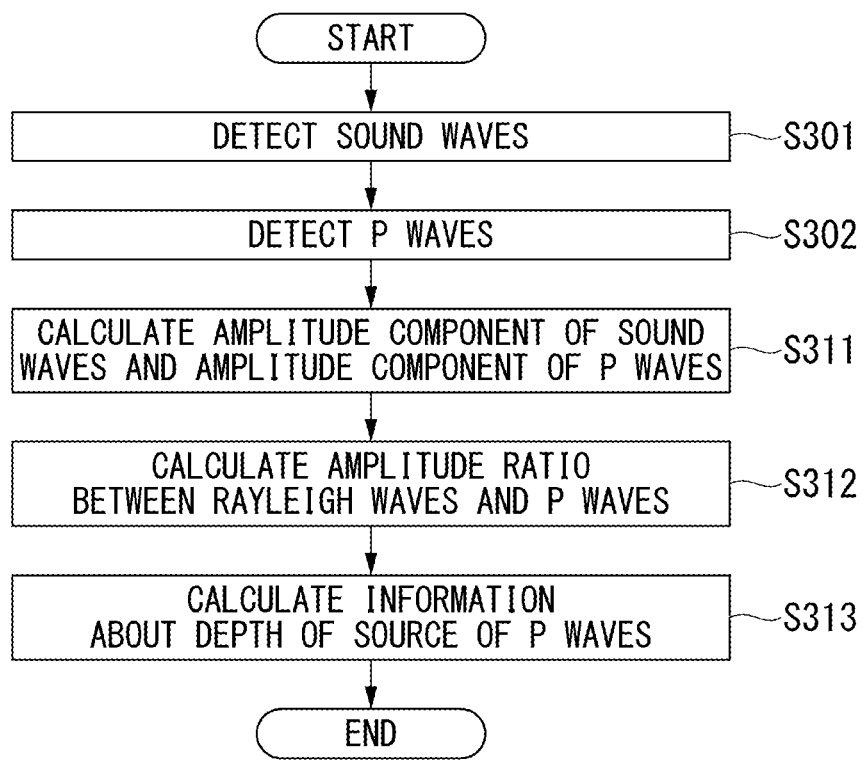
FIG. 16 is a flowchart showing an example of a flow of a measurement method of the second embodiment.

Next, a measurement method of measuring the depth D of the source 200 using the measurement device 102 will be described. FIG. 16 is a flowchart showing an example of a flow of the measurement method of the second embodiment. As shown in FIG. 16, processing steps up to step S302 similar to those of the measurement method of the first embodiment are executed.

Next, amplitude information of the sound waves 231 and amplitude information of the P waves 222 are calculated (step S311). On the basis of the calculated amplitude information of the waves, an amplitude ratio between the Rayleigh waves 232-1 for generating the sound waves 231 and the P waves 222 or an amplitude-related physical quantity is calculated (step S312). On the basis of the calculated amplitude ratio or physical quantity, the depth D of the source 200 is calculated and information about the depth D is obtained (step S313).

According to the above-described flow, it is possible to obtain information of the depth D of the source 200 of the P waves 221 within the structure 10 on the basis of the amplitude information of the sound waves 231 detected using the directional ultrasonic sensor 113.

In the measurement device 102 of the second embodiment, the signal processing device 150 obtains information about the depth D of the source 200 of the P waves 221 within the structure 10 on the basis of the amplitude information of the Rayleigh waves 232-1 detected by the ultrasonic sensor 111.

According to the measurement device 102 of the second embodiment, the ultrasonic sensor 111, the AE sensor 112, and the signal processing device 150 are provided, so that, as in the first embodiment, it is possible to measure the depth D of the source 200 (i.e., the damage source) such as a crack within the structure 10 having a thickness of a predetermined value or more for which measurement is difficult in the conventional method such as position evaluation analysis. According to the measurement device 102 of the second embodiment, because the amplitude information of the Rayleigh waves 232-1 for generating the sound waves 231 and the amplitude information of the P waves 222 are calculated, it is possible to easily obtain information about a depth D as compared with when the arrival time difference $\Delta t_{p-r}$ is calculated.

Also, according to the measurement device 102 of the second embodiment, the directional ultrasonic sensor 113 is provided, so that it is possible to improve selectivity of the sound waves 231 which are detected by the directional ultrasonic sensor 113 in accordance with a type of a solid material of the structure 10 and a medium adjacent to the structure 10 at the surface 10A. Also, the measurement device 102 of the second embodiment may adopt the configurations of the first and second modified examples of the first embodiment.

According to the measurement method of the second embodiment, the sound waves 231 caused by the Rayleigh waves 232-1 which are the surface waves 202 are detected in addition to the P waves 223-1, so that it is possible to execute measurement related to a depth D which was difficult in a measurement method of detecting only elastic waves without detecting the Rayleigh waves or the sound waves.

As described above, information about the depth D is acquired on the basis of TOA information of the sound waves 231 detected by the directional ultrasonic sensor 113 in the first embodiment and information about the depth D is acquired on the basis of amplitude information of the sound waves 231 detected by the directional ultrasonic sensor 113 in the second embodiment. Also, the signal processing device 150 may obtain both of the TOA information and the amplitude information of the sound waves 231 detected by the directional ultrasonic sensor 113 or may acquire information about the depth D on the basis of both information.

The measurement devices 101 and 102 may include a directional ultrasonic sensor 113, an amplifier 121, a BPF 131, and a signal processing device 150 (see FIG. 6). In this case, the signal processing device 150 may include at least one of the first processor 151 and the fifth processor 155, at least one of the third processor 153 and the seventh processor 157 and at least one of the fourth processor 154 and the eighth processor 158. The third processor 153 and the seventh processor 157 can acquire information about the depth D on the basis of at least one of the TOA information and the amplitude information of the sound waves 231 detected by the directional ultrasonic sensor 113 and a geometrical relationship described in the above-described first principle and the like.

According to at least one embodiment described above, the ultrasonic sensor 111 configured to selectively detect the sound waves 231 caused by the Rayleigh waves 232-1 is provided, so that it is possible to perform measurement in relation to a depth of a damage source in a structure having a thickness of a predetermined value or more.

While several embodiments of the present invention have been described, these embodiments have been presented by way of example and are not intended to limit the scope of the invention. These novel embodiments can be implemented in various other forms, and various omissions, substitutions, and modifications can be made without departing from the spirit of the invention. These embodiments and modifications thereof are included in the scope and spirit of the invention and are included in the invention described in the claims and the equivalent scope thereof.

What is claimed is:

1. A measurement device comprising:
a first detector configured to selectively detect second elastic waves caused by surface waves that are excited when first elastic waves generated inside a structure formed of a solid material have reached a first position on a surface of the structure, and provided at a second position in a medium adjacent to the structure at the surface;
a second detector provided at a third position different from the first position on the surface and configured to detect the first elastic waves; and
an information processing device configured to obtain information about a depth of a source of the first elastic waves within the structure on the basis of information about the second elastic waves detected by the first detector and information about the first elastic waves detected by the second detector, wherein:
the first detector includes a directional sensor configured to detect the second elastic waves emitted to the second position in the medium after the first elastic waves have reached the first position on the surface,
an axis line representing directivity of the directional sensor is tilted at a predetermined angle with respect to a normal line to the surface,
the information processing device includes a first processor connected to the first detector, a second processor connected to the second detector, a third processor connected to the first processor and the second processor, and a fourth processor connected to the third processor,
the first processor calculates and outputs a first time of arrival in which the first elastic waves directly propagate from the source to the first position in a direction parallel to a straight line connecting the source and the first position and the second elastic waves propagate from the first position to the second position in a direction tilted in the predetermined angle to a normal line of the surface,
the second processor calculates and outputs a second time of arrival of the first elastic waves directly propagating from the source to the third position in a direction parallel to a straight line connecting the source and the third position,
the third processor acquires a third time of arrival of the first elastic waves directly propagating from the source to the first position by subtracting propagation time of the second elastic waves from the first position to the second position in a direction tilted in the predetermined angle to a normal line of the surface from the first time of arrival output from the first processor, calculates a fifth time of arrival by adding the third time of arrival and a fourth time of arrival of a surface wave propagating from the first position to the third position along the surface, calculates and outputs an arrival time difference between the fifth time of arrival and the second time of arrival output from the second processor, and
the fourth processor receives the arrival time difference and a separation distance between a fourth position at which a line normal to the surface through the source intersects the surface and the third position, calculates the depth of the source based on the arrival time difference and the separation distance, and outputs the depth of the source.

2. The measurement device according to claim 1, wherein the predetermined angle is expressed by the following equation:

$$\phi = \arcsin\left(\frac{V_{air}}{V_{ae}}\right)$$

where a velocity of the second elastic waves is denoted by $V_{air}$ and a velocity at which a sound point source propagates through the structure is denoted by $V_{ae}$.

3. The measurement device according to claim 1, wherein the first detector includes a plurality of directional sensors disposed radially with respect to a predetermined center position of the surface and,
wherein each reception axis of the plurality of directional sensors is directed to the predetermined center position.

4. The measurement device according to claim 1, wherein:
  the solid material is concrete, and
  the fourth processor calculates the depth of the source expressed by the following equation:

$$\Delta t_{p-r} = \frac{1}{V_p}\left(\sqrt{L^2 + D^2} - 1.0233e^{-3} \cdot D - 1.5504 \cdot L\right),$$

where the difference between the fifth time of arrival and the second time of arrival is denoted by $\Delta t_{p-r}$ a velocity of the first elastic waves in the structure is denoted by $V_p$, the separation distance between the fourth position and the third position is denoted by L, and the depth of the source is denoted by D.

5. A measurement method comprising:
  selectively detecting second elastic waves caused by surface waves that are excited when first elastic waves generated inside a structure formed of a solid material have reached a first position on a surface of the structure;
  detecting the first elastic waves which reach a third position different from the first position; and
  acquiring information about a depth of a source of the first elastic waves within the structure on the basis of information about the detected second elastic waves and information about the detected first elastic waves, wherein:
    calculating a first time of arrival in which the first elastic waves directly propagate from the source to the first position in the structure in a direction parallel to a straight line connecting the source and the first position and the second elastic waves propagate from the first position to a second position in a direction tilted in a predetermined angle to a normal line of the surface,
    calculating a second time of arrival of the first elastic waves directly propagating from source to the third position in a direction parallel to a straight line connects the source and the third position,
    calculating a third time of arrival of the first elastic waves directly propagating from the source to the first position by subtracting propagation time of the second elastic waves from the first position to the second position in a direction tilted in the predetermined angle to a line normal to the surface from the first time of arrival, a fifth time of arrival by adding the third time of arrival and a fourth time of arrival of the surface wave propagating from the first position to the third position along the surface, and an arrival time difference between the fifth time of arrival and the second time of arrival, and
    calculating the depth of the source from the arrival time difference and a separation distance between a fourth position at which a line normal to the surface through the source intersects the surface and the third position.

6. The measurement method according to claim 5, wherein, the predetermined angle is expressed by the following equation:

$$\phi = \arcsin\left(\frac{V_{air}}{V_{ae}}\right)$$

where a velocity of the second elastic waves is denoted by $V_{air}$ and a velocity at which a sound point source propagates through the structure is denoted by $V_{ae}$.

7. The measurement method according to claim 5, comprising:
  detecting the surface waves from a plurality of positions disposed radially with respect to a predetermined center position of the surface.

8. The measurement method according to claim 5, wherein the solid material is concrete, and further comprising:
  calculating the depth of the source expressed by the following equation:

$$\Delta t_{p-r} = \frac{1}{V_p}\left(\sqrt{L^2 + D^2} - 1.0233e^{-3} \cdot D - 1.5504 \cdot L\right),$$

where the difference between the fifth time of arrival and the second time of arrival is denoted by $\Delta t_{p-r}$, a velocity of the first elastic waves in the structure is denoted by $V_p$, the separation distance between the fourth position and the third position is denoted by L, and the depth of the source is denoted by D.

* * * * *

UNITED STATES PATENT AND TRADEMARK OFFICE
CERTIFICATE OF CORRECTION

| | |
|---|---|
| PATENT NO. | : 11,493,335 B2 |
| APPLICATION NO. | : 17/183275 |
| DATED | : November 8, 2022 |
| INVENTOR(S) | : Takashi Usui |

It is certified that error appears in the above-identified patent and that said Letters Patent is hereby corrected as shown below:

In the Claims

Claim 4, Column 17, Line 12:
"the second time of arrival is denoted by $\Delta t_{p\text{-}r}$ a velocity"
Should read:
--the second time of arrival is denoted by $\Delta t_{p\text{-}r}$, a velocity--.

Signed and Sealed this
Sixth Day of June, 2023

Katherine Kelly Vidal
*Director of the United States Patent and Trademark Office*